(12) United States Patent
Liu et al.

(10) Patent No.: US 7,574,607 B1
(45) Date of Patent: Aug. 11, 2009

(54) SECURE PIPELINE PROCESSING

(75) Inventors: Gary G. Liu, Plano, TX (US); David P. Cook, Dallas, TX (US)

(73) Assignee: Zix Corporation, Dallas, TX (US)

( * ) Notice: Subject to any disclaimer, the term of this patent is extended or adjusted under 35 U.S.C. 154(b) by 1345 days.

(21) Appl. No.: 10/284,427

(22) Filed: Oct. 29, 2002

(51) Int. Cl.
*H04L 9/00* (2006.01)
*H04L 9/32* (2006.01)

(52) U.S. Cl. .................. 713/181; 713/156; 713/157; 713/158; 713/175; 726/10; 726/26

(58) Field of Classification Search ......... 713/156–158, 713/175, 181; 726/10, 26
See application file for complete search history.

(56) References Cited

U.S. PATENT DOCUMENTS

| | | | | |
|---|---|---|---|---|
| 4,868,877 A * | 9/1989 | Fischer | ...... | 713/157 |
| 5,850,451 A * | 12/1998 | Sudia | ...... | 380/286 |
| 5,903,882 A * | 5/1999 | Asay et al. | ...... | 705/44 |
| 6,076,162 A * | 6/2000 | Deindl et al. | ...... | 713/159 |
| 6,145,079 A * | 11/2000 | Mitty et al. | ...... | 713/170 |
| 6,219,669 B1 * | 4/2001 | Haff et al. | ...... | 707/10 |
| 6,226,618 B1 * | 5/2001 | Downs et al. | ...... | 705/1 |
| 6,233,565 B1 * | 5/2001 | Lewis et al. | ...... | 705/35 |
| 6,253,322 B1 * | 6/2001 | Susaki et al. | ...... | 713/170 |
| 6,483,921 B1 * | 11/2002 | Harkins | ...... | 380/286 |
| 6,510,513 B1 * | 1/2003 | Danieli | ...... | 713/156 |
| 6,571,334 B1 * | 5/2003 | Feldbau et al. | ...... | 713/170 |
| 6,615,347 B1 * | 9/2003 | de Silva et al. | ...... | 713/156 |
| 6,694,434 B1 * | 2/2004 | McGee et al. | ...... | 713/189 |
| 6,959,288 B1 * | 10/2005 | Medina et al. | ...... | 705/51 |
| 6,978,367 B1 * | 12/2005 | Hind et al. | ...... | 713/167 |
| 6,983,371 B1 * | 1/2006 | Hurtado et al. | ...... | 713/189 |
| 7,194,620 B1 * | 3/2007 | Hayes | ...... | 713/157 |
| 2001/0009025 A1 * | 7/2001 | Ahonen | ...... | 713/161 |
| 2001/0037453 A1 * | 11/2001 | Mitty et al. | ...... | 713/168 |
| 2002/0004902 A1 * | 1/2002 | Toh et al. | ...... | 713/170 |
| 2002/0016910 A1 * | 2/2002 | Wright et al. | ...... | 713/150 |
| 2002/0019932 A1 * | 2/2002 | Toh et al. | ...... | 713/155 |
| 2002/0091782 A1 * | 7/2002 | Benninghoff, III | ...... | 709/206 |
| 2002/0116610 A1 * | 8/2002 | Holmes et al. | ...... | 713/156 |
| 2002/0138735 A1 * | 9/2002 | Felt et al. | ...... | 713/176 |
| 2002/0144120 A1 * | 10/2002 | Ramanathan | ...... | 713/175 |
| 2002/0161723 A1 * | 10/2002 | Asokan et al. | ...... | 705/67 |
| 2003/0084298 A1 * | 5/2003 | Messerges et al. | ...... | 713/176 |
| 2003/0105876 A1 * | 6/2003 | Angelo et al. | ...... | 709/237 |
| 2003/0126085 A1 * | 7/2003 | Srinivasan | ...... | 705/51 |
| 2003/0212893 A1 * | 11/2003 | Hind et al. | ...... | 713/177 |

* cited by examiner

*Primary Examiner*—Ayaz R Sheikh
*Assistant Examiner*—Trang Doan
(74) *Attorney, Agent, or Firm*—Fish & Richardson P.C.

(57) ABSTRACT

Methods and apparatus for secure transmission of data in pipeline fashion. A pair of transaction certificates can be used to verify the authenticity and integrity of data transmitted in more than one block.

31 Claims, 3 Drawing Sheets

SECURE PIPELINE PROCESSING

TECHNICAL FIELD

This invention relates to methods and apparatus for transferring data.

BACKGROUND

With the advent of modern computer technology, individuals increasingly use electronic means to transfer information from one location to another. Computer files or other information can be quickly sent, via a computer network, to virtually anyone whether they be in the office down the hall or halfway around the globe. Data is sent very rapidly, enhancing communication and productivity in many organizations. Many different protocols, or formats for transferring data, exist which allow different types of files to be transferred, including the File Transfer Protocol (FTP) and the Simple Mail Transfer Protocol (SMTP).

Often the files to be transferred contain sensitive information that the sender and intended recipient would like to transfer securely. The interception or inadvertent disclosure of sensitive information can have many serious consequences. Some sensitive information must be shielded from third parties because of government regulations. Examples of these forms of sensitive information include health information and data such as a person's social security number. Other forms of sensitive information must be shielded from third parties because disclosure can be financially damaging. Sensitive information of this form includes information such as trade secrets and business information such as merger proposals.

When transferring data files containing sensitive information, conventional organizations use some form of security measures to protect the integrity of the data. One method of securing the data is by having the data time stamped, signed, and encrypted before being sent. A popular way to encrypt files uses public key encryption. Public key encryption is an asymmetrical encryption method. A public key is used to encrypt data while a corresponding private key is used to decrypt the data. While many individuals may be able to encrypt data for an individual, only the individual(s) in possession of the private key is able to decrypt the data.

Because of the wider access to public keys, it is important for public keys of the sender and recipient to be certified by a certificate authority to insure the authenticity of the encryption. Additionally, any time stamp on the data should be tied to a hash of the data (e.g., the underlying message) in order to ensure the data has not been tampered with in transit. A hash is a number that can be generated from a string of text. The hash is generated by a formula that makes it extremely difficult to find a text that will result in a given hash value, and extremely unlikely for any two non-identical strings to produce the same hash value. By comparing hash values, a comparison routine can determine whether or not strings of text are identical.

Use of a transaction certificate is one method that combines key certification with the message hash and time stamp. A transaction certificate ties together the sender's identity, the sender's public key, the recipient's identity, the recipient's public key, the message hash, and message time all in one certificate.

One problem arises, however, when one desires to transmit a large volume of data. Attempts to transmit all the data in one chunk are often disadvantageous because the "bulk" transmission requires considerable processor memory and immediate storage space at the receiving site. Consequently, it is desirable to send large amounts of data in a pipelined fashion. Pipelines involve breaking the data up into smaller blocks and then sending the blocks one at a time. The pipeline data can then be processed one block at a time resulting in greater performance. Several different protocols are capable of supporting pipelined data transfers, including FTP, SMTP, and HTTP (HyperText Transfer Protocol).

When pipeline transfers are employed, a transaction certificate cannot be used in a traditional way to provide time stamping, key certification, and message integrity protection at the same time. The reason a transaction certification cannot be used in the traditional way is because the transaction certificate and recipient's public key need to be retrieved before the sender transmits the first block of data. However, the message hash that must be sent as part of the request for the transaction certificate can generally only be obtained after the last block of data is processed.

SUMMARY

One aspect of the invention provides a method for securely sending pipelined data. The method includes sending a first transaction certificate and subsequent blocks of data to a data recipient. After sending all the pipelined data, a second transaction certificate is sent which includes a hash of all the data sent including the first transaction certificate.

Another aspect of the invention provides a method for receiving secure pipelined data. The method includes receiving a first data block that is encrypted with a symmetric key encrypted by recipient's public key so that the recipient can decrypt using their private key. With the decrypted symmetric key, the recipient can then decrypt and verify a first transaction certificate. Subsequent pipelined data blocks are received concluding with a second transaction certificate. This second transaction certificate includes a hash of all the pipelined data and the first transaction certificate. The second transaction certificate is verified by the recipient.

Another aspect of the invention provides a method for responding to transaction certificate requests. The method includes receiving a request for a first transaction certificate. A first transaction certificate is then sent to the requestor in response to the request. The first transaction certificate can include a random number in place of a message hash. In an alternative implementation, the message hash in the first transaction certificate can be used to carry some verifiable information on the data available at that time. For example, the message hash can contain the hash of the symmetric key, the first block of data, plus some a random string of data used to modify a password hash. Subsequently, a request for a second transaction certificate is received that includes a hash of all pipelined data and the first transaction certificate. The method is completed when a second transaction certificate is then sent to the requestor.

The invention can be implemented to realize one or more of the following advantages. The use of two transaction certificates allows the sending of blocks of data in pipelined fashion while still maintaining confidence in the integrity and authenticity of the transmitted data. Similarly, a recipient of the data has confidence that each data block is authentic and received without tampering.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention provides a unique method for securely transmitting large amounts of data in a pipelined fashion. It is understood that the following disclosure provides many different implementations, or examples, for implementing different features. Techniques and requirements that are only specific to certain implementations should not be imported into other implementations. Also, specific examples of networks, components, and formats are described below to simplify the present disclosure. These are, of course, merely examples and are not intended to limit the invention from that described in the claims.

Figure 1:
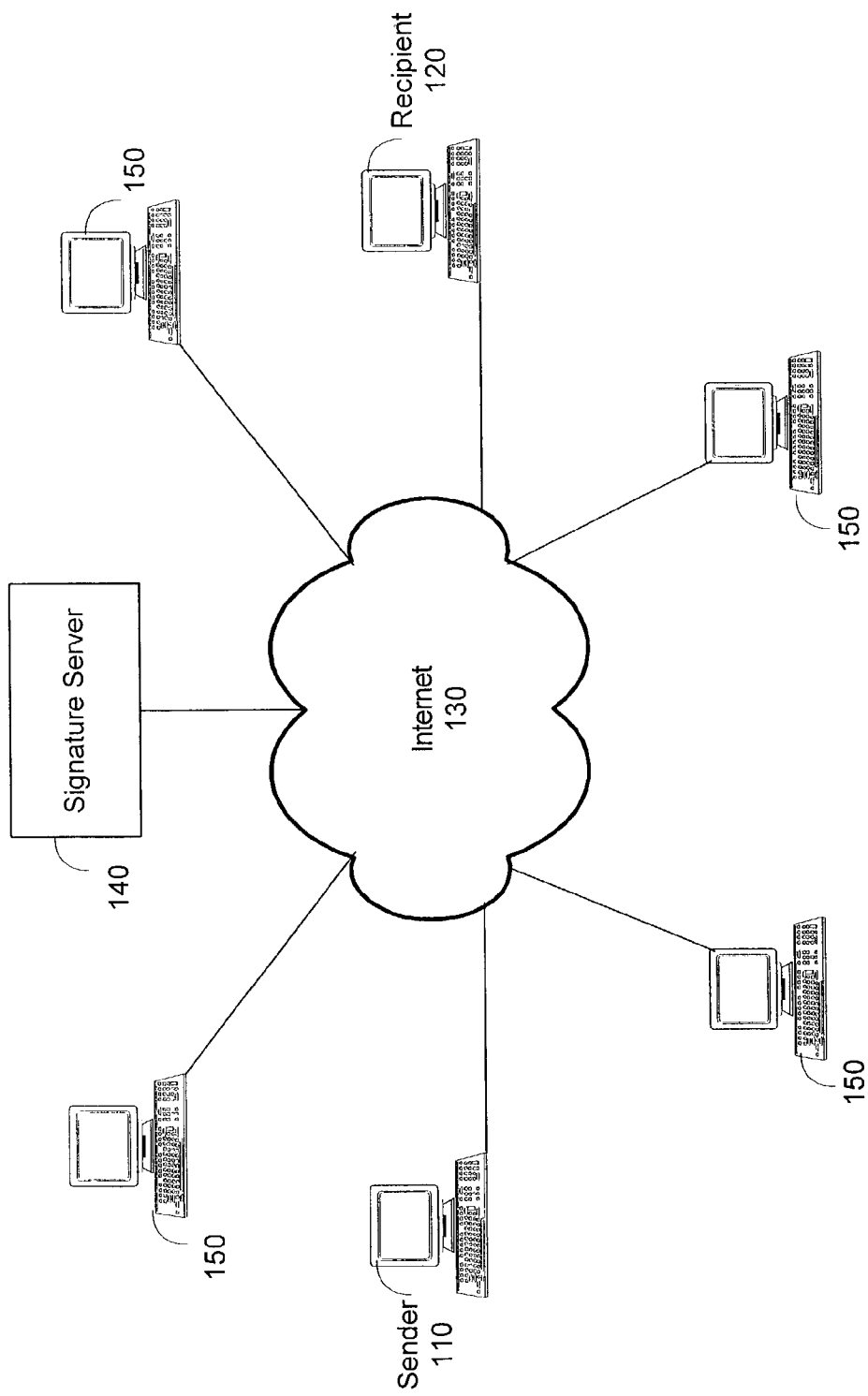
FIG. 1 illustrates a network setup for sending protected data.

A method for securely sending and receiving data sent in a pipelined process is provided, which allows a user to send a large volume of data in blocks while allowing the recipient to verify the time, the authenticity, and integrity of the entire data set without the requirement of preprocessing to obtain integrity information, such as a hash of the data being transmitted. Referring now to FIG. 1, a network architecture is shown. Sender 110 desires to transmit data to recipient 120 though a network such as Internet 130. Internet 130 represents a global network connecting millions of computers allowing for the exchange of data, but it is clearly recognized that the medium through which the transmitted data is to be sent can vary. Computers 150 represent some of the computers connected to Internet 130. The interconnectivity of many different computer systems has many benefits but the expansive access through the same medium poses a security problem for transmissions between sender 110 and recipient 120. A danger therefore exists that some other computer 150 can be used to intercept or modify data transmitted from sender 110 to recipient 120.

Use of signature server 140 to issue transaction certificates to sender 110 gives sender 110 confidence in the authenticity of the recipient's public key, which will be used to encrypt the message. A transaction certificate is attached to the message and subsequently verified by recipient 120. The transaction certificate also gives recipient 120 confidence in the time, authenticity, and integrity of the message. However, in pipelined processing, one transaction certificate cannot be used to simultaneously serve the sender's purpose and the recipient's purpose. To provide the same level of security as can be applied to the transmission of a single piece of data, a pair of transaction certificates can be used with a data set containing many data blocks transmitted in pipelined fashion.

Figure 2:
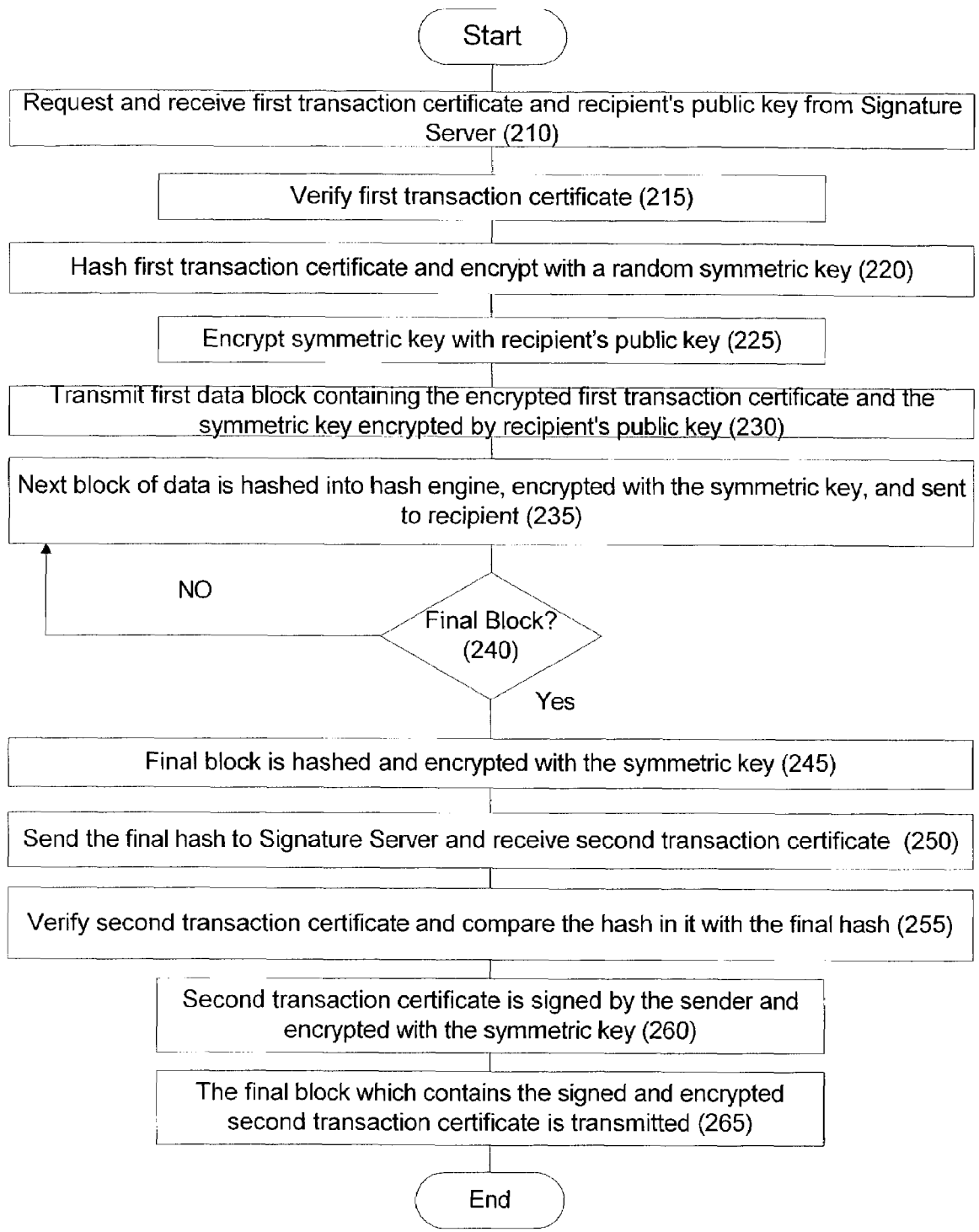
FIG. 2 is a flowchart illustrating a process for sending secured pipelined data.

FIG. 2 details a sending process between sender 110 and recipient 120. The first task in securely sending pipelined data is found in step 210. Sender 110 makes a request for a first transaction certificate from a signature service such as the Zixit Worldwide Signature Server (WSS). A transaction certificate certifies that the recipient's public key is authentic and that the key has a valid status at the time the message is sent. The transaction certificate can also certify the sender's public key.

In one implementation, the request contains several pieces of data. Included within the request can be the sender's identity or hash, the recipient's identity or hash, a random number, and additional information. The random number can be used in place of a complete message hash that normally is sent with a request for a transaction certificate. A message hash is not transmitted in this first certificate request because in general, all the blocks of data to be transmitted have not been processed and the complete message hash is therefore unavailable. Sender 110 can sign the transaction certificate request. The digital signature is used to guarantee authenticity of the sender's identity before issuing the transaction certificate.

Upon receipt of the transaction certificate request, signature server 140 performs rudimentary checks for authenticity such as verifying the digital signature of sender 110. Signature server 140 then sends a first transaction certificate to sender 110. The transaction certificate also contains several pieces of data, which can include: the sender's identity or hash, the sender's public key or hash, the recipient's identity or hash, the recipient's public key or hash, the random number, a time stamp, a root certificate (e.g., signed by four root keys), and a digital signature signing all the data sent. If the first transaction certificate does not contain the recipient's public key, but just its hash, the recipient's public key can be returned separately with the transaction certificate by signature server 140 or the recipient's public key can be independently retrieved or located by sender 110. A root certificate is a certificate that certifies the public key of signature server 140 and includes the public key of the signature server 140 which has been signed by multiple private keys. For example, the Zixit WSS uses four private keys to sign the root certificate. In one implementation, the public keys corresponding to these root private keys are coded into or otherwise made known to the software component responsible for verifying the transaction certificates.

Additionally, for example, signature server 140 can include enhanced data about sender 110 and recipient 120 in the first transaction certificate. The enhanced data can include information regarding the length of time since the sender's public key was activated, the cumulative number of messages sent by sender 110, the number of unique recipients sent to by sender 110, the length of time since the recipient's public key was activated, and/or the cumulative number of messages sent by recipient 120.

Once the first transaction certificate has been received from signature server 140, sender 110 verifies the first transaction certificate at step 215. For example, with a transaction certificate received from the signature server 140, several different parts of the transaction certificate can be verified. The root certificate can be verified using the known (e.g., four known) root public keys. In the example of the Zixit system, the four root keys can be hard coded into the verification program. Also, the signature server's signature can be verified using the public key contained in the root certificate. Additionally, the random number can be verified to be the same as the random number that was sent with the request. Further, the sender's and recipient's identity or hash can be checked for consistency with the data sent in the request. The sender's public key or hash sent as part of the transaction certificate can be verified as consistent with the sender's public key. Where only the hash of the recipient's public key was transmitted as part of the transaction certificate, the hash can be used to verify the public key sent along with the first transaction certificate by hashing the public key received and comparing it to the hash value provided in the transaction certificate.

If the verification succeeds, the process moves to step 220. Here sender 110 initializes a hash engine and also generates a random symmetric key. Using the hash engine, the first transaction certificate is hashed, then encrypted with the random symmetric key. At step 225, the random symmetric key is encrypted using the recipient's public key, which was received in or with the first transaction certificate. Sender 110 is now ready to send the first block of data to recipient 120, which takes place at step 230. In one implementation, this first block of data contains the unencrypted hash of the recipient's public key, the symmetric key encrypted by the recipient's public key, and the first transaction certificate encrypted by the symmetric key. The first block of data can be signed by sender 110 before being encrypted by the symmetric key. The purpose for sending the hash of the recipient's public key in the first block is to enable recipient 120 having multiple public keys to know which corresponding private key to use to decrypt the symmetric key. Clearly, if recipient 120 only has one public key or knows which public key sender 110 is using, the hash is not needed.

Sender 110 then processes the next block of data to be sent to recipient 120 at step 235. Each block of data is hashed by the hash engine (which makes a running "total" of all the data previously hashed) and encrypted with the symmetric key. The encrypted data block is then sent along to recipient 120. This process continues with each block of data to be sent to recipient 120 until the last data block is determined at step 240. The final data block is then processed at step 245 in a similar manner as before. The final data block is hashed by the hash engine and encrypted with the symmetric key. Sender 110 then receives the final hash from the hash engine at step 250. The final hash reflects all of the data sent, including the first transaction certificate and all of the subsequent data blocks. Using the final hash as data, sender 110 then requests a second transaction certificate from signature server 140. The second request is identical to the first request except that the final hash is included in place of the random number.

Upon receipt, the second transaction certificate is verified at step 255 in the same manner as the first transaction certificate above. Sender 110 then digitally signs the second transaction certificate using the private key that corresponds to sender's public key hash in the transaction certificate and encrypts the data with the symmetric key at step 260. Finally, the signed and encrypted second transaction certificate along with the sender's public key and final encrypted data block are transmitted to recipient 120 at step 265.

Figure 3:
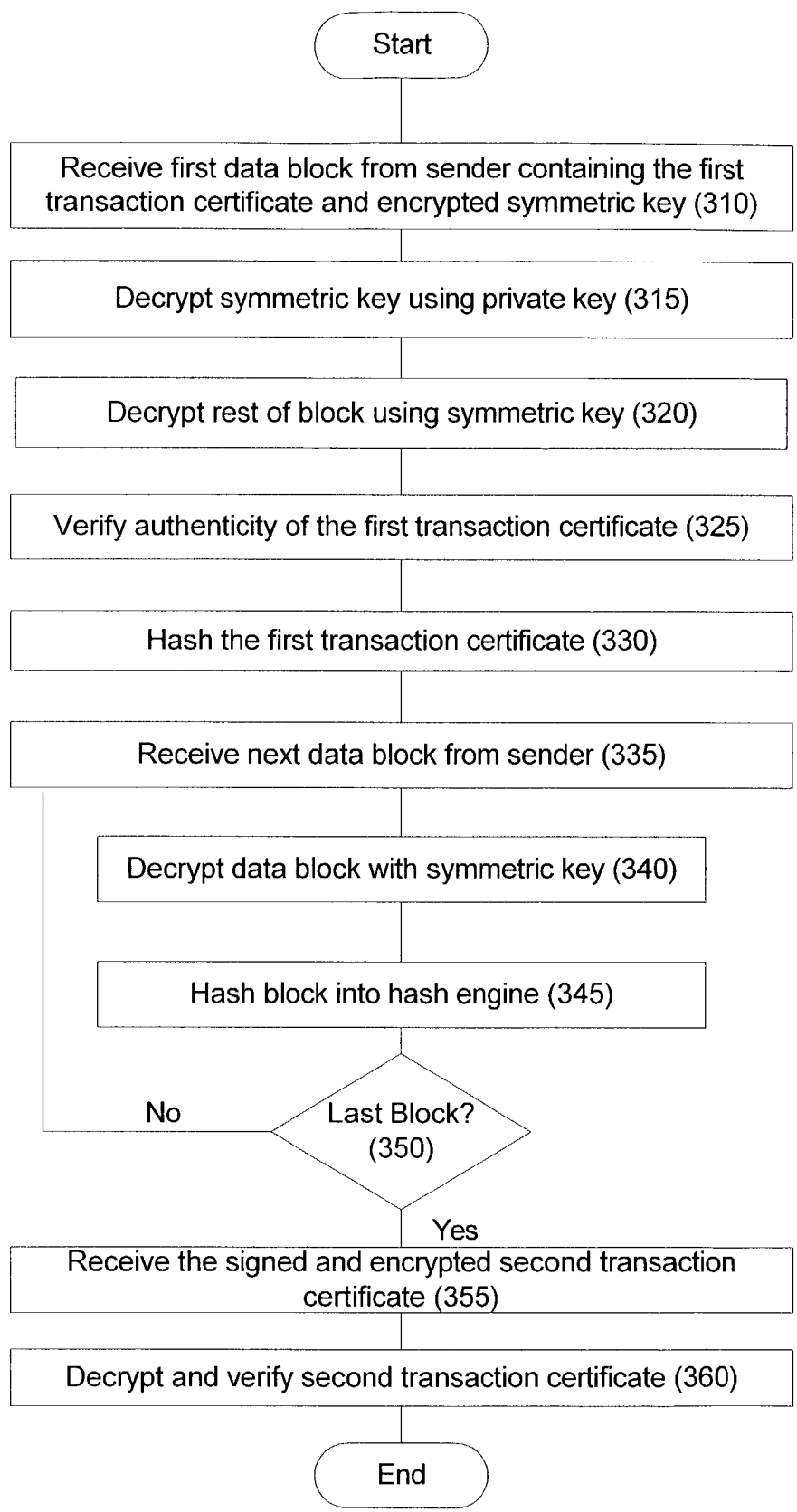
FIG. 3 is a flowchart illustrating a process for receiving secured pipelined data.

Referring now to FIG. 3, a flowchart describing a method of receiving secure pipelined data is presented. The process begins at step 310 when recipient's 120 receives the first data block from sender 110. The first block of data contains the first transaction certificate and the public key encrypted symmetric key. The first block of data can also contain the hash of the recipient's public key used to encrypt the symmetric key. If necessary, recipient 120 uses the hash of the recipient's public key to identify which public key was used to encrypt the symmetric key. At step 315, recipient 120 then uses the appropriate private key (e.g., the key that corresponds to the public key used to encrypt the symmetric key) to decrypt the symmetric key. At step 320, recipient 120 uses the symmetric key to decrypt the first transaction certificate.

At step 325, recipient 120 then verifies the authenticity of the first transaction certificate. Several steps can be taken to verify the first transaction certificate's authenticity. Recipient 120 can verify that the time stamp contained in the first transaction certificate is consistent with the current time (e.g., within a range consistent with reasonable clock accuracy and transmission delays). If the times are inconsistent, it can mean that the message was tampered with or unreasonably delayed during transmission. Also, recipient 120 can verify the root certificate contained in the first transaction certificate using the root public keys hard coded into the verification program. Additionally, the signature that signed the first transaction certificate can be verified. For example, if using the WSS, the WSS public key contained in the root certificate can be used to verify the WSS signature that signed the first transaction certificate. If the first block of data is signed by sender 110, the sender's digital signature should also be verified using sender's public key. In one embodiment, if any step in the verification process fails, the process of receiving data is aborted.

If the first transaction certificate is properly verified, recipient 120 initializes a hash engine and hashes the first transaction certificate at step 330. The next block of data is then received at step 335. This second block of data is first decrypted with the symmetric key and then hashed by the hash engine. This process is repeated for each data block until receipt of the final block at step 355. This final block, containing a second transaction certificate that has been signed by sender 110, is decrypted by recipient 120 using the symmetric key and then verified at step 360. The second transaction certificate should not be hashed into the hash engine, because the second transaction certificate was not hashed into the hash engine during the sending process. The verification process for the second transaction certificate can contain multiple steps.

The final hash from the hash engine can be compared to the complete message hash in the second transaction certificate. The two hashes should match as both contain a hash of the first transaction certificate plus all the data blocks sent, excluding the final block that contains the second transaction certificate and the sender's signature. Secondly, the sender's signature that signed the second transaction certificate is verified using the appropriate public key. The signature within the second transaction certificate is also verified. For example, if the transaction certificate was obtained through the WSS, the WSS signature on the certificate can be verified using the WSS public key contained in the root certificate of the second transaction certificate. The root certificate is also verified using the four known root public keys.

Also compared for consistency between the first and second transaction certificates are the sender's identity or hash, the sender's public key or hash, the recipient's identity or hash, and the recipient's public key or hash. The recipient's public key or hash in the second transaction certificate should also be consistent with the recipient's own public key associated with the private key used to decrypt the initial data. Furthermore, the time stamp in the second transaction certificate should be consistent with the current time in order to ensure that the message was not tampered with or delayed. The time stamp in the second transaction certification must be later than the time stamp in the first transaction certificate.

If these verifications succeed, then the complete block stream of data has been successfully received and verified in pipelined fashion. Using just two transaction certificates it is possible to securely transmit virtually any amount of data in pipelined form. This method of sending and receiving data securely though pipelined processing allows for the confident transmission of a large amount of data with a high degree of assurance of the time, the authenticity, and the integrity of the data transmitted.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed for one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet 130.

The computing system can include clients and servers. A client and server are generally remote from each other and typically interact through a communication network. The relationship of client and server arises by virtue of computer programs running on the respective computers and having a client-server relationship to each other.

Some features of the disclosure will be used without corresponding use of other features. Furthermore, additional features may be employed without changing the operation of the present invention. Accordingly, it is appropriate that the appended claims be construed broadly and in a manner consistent with the disclosure.

What is claimed is:

1. A method for sending pipelined data, comprising
sending, by a sender, a first transaction certificate to a data recipient including a first identifier prior to sending blocks of data;
sending, by the sender, the blocks of data; and
sending, by the sender, a second transaction certificate to the data recipient after sending the blocks of data, the second transaction certificate including a hash of the blocks of data and the first transaction certificate.

2. The method of claim 1, further comprising:
requesting a first transaction certificate from a signature authority, the first transaction certificate request including the first identifier.

3. The method of claim 2, wherein:
the first identifier is a random number, and the step of requesting a first transaction certificate includes providing the random number in place of a message hash in the first transaction certificate request.

4. The method of claim 3, further comprising:
receiving a signed first transaction certificate from the signature authority.

5. The method of claim 4, further comprising:
verifying the authenticity of the signed first transaction certificate received from the signature authority.

6. The method of claim 1, further comprising:
hashing and encrypting the first transaction certificate with a random symmetric key, the random symmetric key then encrypted with the data recipient's public key prior to sending the first transaction certificate to the data recipient.

7. The method of claim 1, further comprising:
hashing each data block before sending each to the data recipient.

8. The method of claim 1, further comprising:
requesting, by the sender, a second transaction certificate after all pipelined data have been processed, wherein requesting a second transaction certificate includes requesting the second transaction certificate from a certificate authority and providing a final hash corresponding to all the blocks of data sent to the data recipient;
receiving the second transaction certificate; and
verifying the second transaction certificate prior to transmission to the data recipient.

9. The method of claim 1, further comprising:
digitally signing the second transaction certificate prior to transmission to the data recipient.

10. The method of claim 1, further comprising:
encrypting the second transaction certificate with the symmetric key prior to transmission to the data recipient.

11. A method of processing pipelined data received from a sender comprising:
receiving, by a recipient, a first block of data from the sender including a first transaction certificate, the first transaction certificate including a first identifier;
verifying, by the recipient, the first transaction certificate;
receiving each successive block of pipelined data;
receiving, by the recipient, a second transaction certificate after receipt of at least one block of pipelined data, the second transaction certificate including a hash of the first transaction certificate and all pipeline data; and
verifying, by the recipient, the second transaction certificate.

12. The method of claim 11 wherein the first transaction certificate is encrypted and wherein the method includes:
receiving an encrypted symmetric key, the symmetric key encrypted with a public key;

decrypting the encrypted symmetric key with a corresponding private key; and decrypting the first transaction certificate with the symmetric key.

13. The method of claim 12 wherein each block of data received is encrypted and the method further comprising decrypting each block of received data with the symmetric key.

14. The method of claim 11, wherein verifying the second transaction certificate includes hashing the first transaction certificate along with each block of data received and comparing a hash included with the second transaction certificate with a locally computed hash.

15. A method of processing pipelined data received from a sender comprising:

sending, by a sender, a first transaction certificate request containing a random number to a signature server;

transmitting, by the signature server, a signed first transaction certificate to the sender in response to the first transaction certificate request;

sending, by the sender, blocks of data to a recipient; and sending, by the sender, a second transaction certificate to the recipient after sending all blocks of data, the second transaction certificate including a hash of the blocks of data and the first transaction certificate.

16. The method of claim 15, further comprising:

receiving, by the sender, the signed first transaction certificate from the signature server;

hashing, by the sender, the first transaction certificate;

encrypting, by the sender, the first transaction certificate with a random symmetry key;

encrypting, by the sender, the random symmetry key using a recipient's public key included in the first transaction certificate; and sending, by the sender, the encrypted first transaction certificate and encrypted random symmetry key to the recipient.

17. The method of claim 16, wherein sending blocks of data includes hashing each block of data and encrypting each block of data with the random symmetry key prior to being sent to the recipient.

18. The method of claim 16, wherein sending blocks of data includes sending a first block of data containing the random symmetry key encrypted by the recipient's public key and the first transaction certificate encrypted by the symmetry key.

19. The method of claim 18, wherein sending blocks of data further includes sending an unencrypted hash of the recipient's public key.

20. The method of claim 18, further comprising receiving, by a sender, a final hash value associated with a last block of data to be sent to the recipient from a hash engine, the final hash value indicative of previous blocks of data and first transaction certificate sent to the recipient.

21. The method of claim 20, further comprising requesting, by the sender, a second transaction certificate containing the final hash value from the signature server.

22. The method of claim 15, wherein sending blocks of data to a recipient includes sending a first block of blocks of data containing the first transaction certificate and a random symmetry key used to encrypt the first transaction certificate to the recipient, the random symmetry key being encrypted by the recipient's public key.

23. The method of claim 22, further comprising:

receiving a first block of data encrypted with the random symmetry key from the sender;

decrypting the random symmetry key using a private key that corresponds to the recipient's public key; and decrypting the first block of data using the decrypted random symmetry key.

24. The method of claim 20, further comprising:

receiving a last block of data containing the second transaction certificate from the sender;

decrypting the last block of data using the decrypted random symmetry key; and comparing the hash of the data with the final hash value.

25. A machine-readable storage device having instructions stored thereon, which, when executed by a processor, causes the processor to perform the operations of:

sending, by a sender, a first transaction certificate to a data recipient including a first identifier prior to sending blocks of data;

sending, by the sender, the blocks of data; and sending, by the sender, a second transaction certificate to the data recipient after sending the blocks of data, the second transaction certificate including a hash of the blocks of data and the first transaction certificate.

26. A machine-readable storage device having instructions stored thereon, which, when executed by a processor, causes the processor to perform the operations of:

receiving, by a recipient, a first block of data from the sender including a first transaction certificate, the first transaction certificate including a first identifier;

verifying, by the recipient, the first transaction certificate;

receiving each successive block of pipelined data;

receiving, by the recipient, a second transaction certificate after receipt of at least one block of pipelined data, the second transaction certificate including a hash of the first transaction certificate and all pipelined data; and verifying, by the recipient, the second transaction certificate.

27. The method of claim 1, wherein sending a second transaction certificate including a hash of the blocks of data and the first transaction certificate includes sending a second transaction certificate including a hash of the blocks of data and a hash of the first transaction certificate.

28. The method of claim 11, where receiving a second transaction certificate including a hash of the first transaction certificate and all pipeline data includes receiving the second transaction certificate including a hash of the first transaction certificate and a hash of all pipeline data.

29. The method of claim 15, where sending a second transaction certificate including a hash of the blocks of data and the first transaction certificate includes sending the second transaction certificate including a hash of the blocks of data and a hash of the first transaction certificate.

30. The machine-readable storage device of claim 25, where sending a second transaction certificate including a hash of the blocks of data and the first transaction certificate includes sending the second transaction certificate including a hash of the blocks of data and a hash of the first transaction certificate.

31. The machine-readable storage device of claim 26, where receiving a second transaction certificate including a hash of the first transaction certificate and all pipeline data includes receiving a second transaction certificate including a hash of the first transaction certificate and a hash of all pipeline data.

* * * * *

UNITED STATES PATENT AND TRADEMARK OFFICE
CERTIFICATE OF CORRECTION

| | | |
|---|---|---|
| PATENT NO. | : 7,574,607 B1 | Page 1 of 2 |
| APPLICATION NO. | : 10/284427 | |
| DATED | : August 11, 2009 | |
| INVENTOR(S) | : Gary G. Liu | |

It is certified that error appears in the above-identified patent and that said Letters Patent is hereby corrected as shown below:

Column 8, line 61 (claim 11, line 11) delete "pipeline" and insert --pipelined--, therefor.

Column 9, line 33 (claim 16, line 6) delete "symmetry" and insert --symmetric--, therefor.

Column 9, line 34 (claim 16, line 7) delete "symmetry" and insert --symmetric--, therefor.

Column 9, line 38 (claim 16, line 11) delete "symmetry" and insert --symmetric--, therefor.

Column 9, line 43 (claim 17, line 3) delete "symmetry" and insert --symmetric--, therefor.

Column 9, line 47 (claim 18, line 3) delete "symmetry" and insert --symmetric--, therefor.

Column 9, line 48 (claim 18, line 4) delete "symmetry" and insert --symmetric--, therefor.

Column 9, line 65 (claim 22, line 4) delete "symmetry" and insert --symmetric--, therefor.

Column 9, line 66 (claim 22, line 5) delete "symmetry" and insert --symmetric--, therefor.

Column 10, line 3 (claim 23, line 3) delete "symmetry" and insert --symmetric--, therefor.

Column 10, line 4 (claim 23, line 4) delete "symmetry" and insert --symmetric--, therefor.

Column 10, line 7 (claim 23, line 7) delete "symmetry" and insert --symmetric--, therefor.

Column 10, line 12 (claim 24, line 5) delete "symmetry" and insert --symmetric--, therefor.

UNITED STATES PATENT AND TRADEMARK OFFICE
CERTIFICATE OF CORRECTION

PATENT NO. : 7,574,607 B1
APPLICATION NO. : 10/284427
DATED : August 11, 2009
INVENTOR(S) : Gary G. Liu It is certified that error appears in the above-identified patent and that said Letters Patent is hereby corrected as shown below:

Column 10, line 46 (claim 28, line 3) delete "pipeline" and insert --pipelined--, therefor.

Column 10, line 48 (claim 28, line 5) delete "pipeline" and insert --pipelined--, therefor.

Column 10, line 62 (claim 31, line 3) delete "pipeline" and insert --pipelined--, therefor.

Column 10, lines 64-65 (claim 31, lines 5-6) delete "pipeline" and insert --pipelined--, therefor.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,574,607 B1  Page 1 of 1
APPLICATION NO. : 10/284427
DATED : August 11, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2015 days.

Signed and Sealed this

Seventh Day of September, 2010

David J. Kappos
*Director of the United States Patent and Trademark Office*